US006999681B2

(12) United States Patent
Gruber et al.

(10) Patent No.: US 6,999,681 B2
(45) Date of Patent: Feb. 14, 2006

(54) METHOD OF SEAMLESS MIGRATION FROM STATIC TO AGILE OPTICAL NETWORKING

(75) Inventors: John Gruber, Orleans (CA); Jonathan Bosloy, Kanata (CA); Hanan Anis, Kanata (CA); Raza Paiam, Ottawa (CA)

(73) Assignee: PTS Corporation, San Jose, CA (US)

( * ) Notice: Subject to any disclaimer, the term of this patent is extended or adjusted under 35 U.S.C. 154(b) by 747 days.

(21) Appl. No.: 10/054,775

(22) Filed: Jan. 23, 2002

(65) Prior Publication Data

US 2004/0208548 A1 Oct. 21, 2004

(51) Int. Cl.
*H04B 14/00* (2006.01)

(52) U.S. Cl. ........................................... 398/50; 398/48

(58) Field of Classification Search .................. 398/48, 398/49, 50, 51
See application file for complete search history.

(56) References Cited

U.S. PATENT DOCUMENTS 6,084,694 A * 7/2000 Milton et al. ................. 398/83
6,272,154 B1 8/2001 Bala et al. .................. 370/535
6,678,473 B1 * 1/2004 Morthier ...................... 398/56

FOREIGN PATENT DOCUMENTS

EP 0 905 936 A2 3/1999
EP 1 081 880 A1 3/2001

OTHER PUBLICATIONS

PCT International Search Report PCT/IB 03/00154, May 23, 2003.

* cited by examiner

*Primary Examiner*—Jason Chan
*Assistant Examiner*—Christina Y Leung
(74) *Attorney, Agent, or Firm*—Harness, Dickey & Pierce, P.L.C.

(57) ABSTRACT

A method is provided for seamless migration from static to agile optical networking at a network switching node in an optical transport network. The seamless method includes: providing an optical signal splitter at the input of the network switching node, the signal splitter being adapted to receive an optical multiplexed signal having a plurality of data signals and at least one data signal being agile; providing an optical signal combiner at the output of the network switching node; and introducing a photonic cross-connect switch between the signal splitter and the signal combiner, where the photonic switch is operable to switch the agile data signals.

17 Claims, 16 Drawing Sheets

METHOD OF SEAMLESS MIGRATION FROM STATIC TO AGILE OPTICAL NETWORKING

FIELD OF THE INVENTION

The present invention relates generally to photonic switching in optical transport networks and, more particularly, to a method of seamless migration from static to agile optical networking.

BACKGROUND OF THE INVENTION

Connections through current optical networks are either manually provisioned and remain static, and/or use electrical cross-connect switches for more automated provisioning and flexible connectivity.

Static connections are appropriate for services that are unlikely to change, and include the advantage of lowest possible loss. For high capacity networks, static connections can be rapidly provisioned into pre-planned end-to-end bands of wavelengths. For example, a wavelength division multiplexing (WDM) system may support the photonic routing of wavelengths in a group rather than individually, the group being called a waveband. An example size for a waveband is eight wavelengths. Once a waveband has been set up across the network, new wavelengths can be quickly added at the two endpoints of the previously established waveband without having to modify the network core. In this case, connections are agile at the network edge, while still static in the network core. There is also a need for connections not only edge agile, but core agile as well. Core network agility can be provided through the use of electrical cross-connect switches. However, this approach has the disadvantage of introducing numerous optical-electrical-optical conversion devices and related costs into the network. Photonic switching enables an agile optical layer, providing remote re-configuration and automated restoration.

Therefore, it is desirable to provide agility by means of photonic switching, and a seamless technique for supporting static and agile services in optical network.

SUMMARY OF THE INVENTION

In accordance with the present invention, a method is provided for seamless migration from static to agile optical networking at a network switching node in an optical transport network. The seamless method includes: providing an optical signal splitter at the input of the network switching node, the signal splitter being adapted to receive an optical multiplexed signal having a plurality of data signals and at least one data signal being agile; providing an optical signal combiner at the output of the network switching node; and introducing a photonic cross-connect switch between the signal splitter and the signal combiner, where the photonic switch is operable to switch the agile data signals.

For a more complete understanding of the invention, its objects and advantages, reference may be had to the following specification and to the accompanying drawings.

DETAILED DESCRIPTION OF THE PREFERRED EMBODIMENTS

Figure 1A:
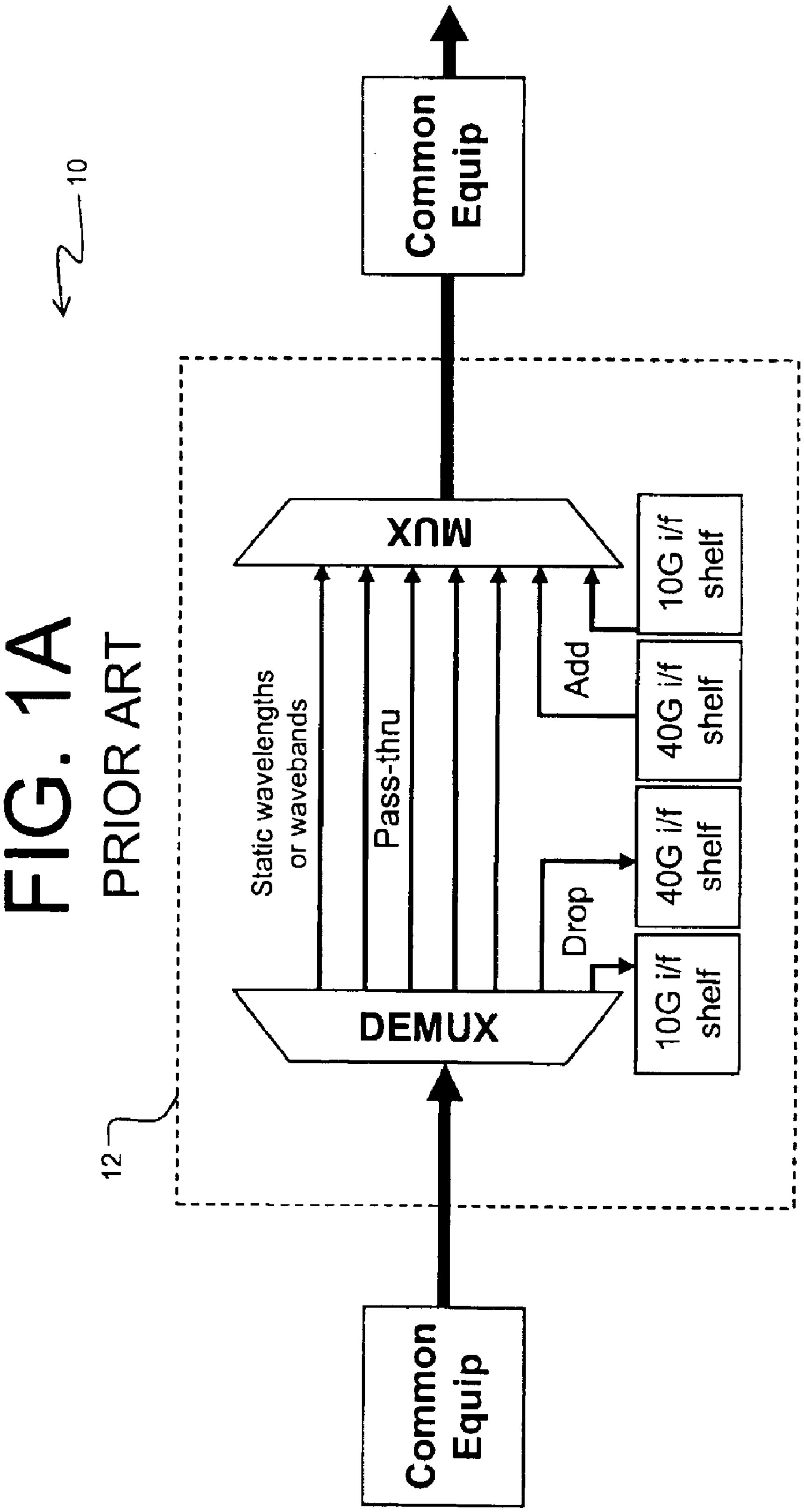
FIGS. 1A–1C are block diagrams illustrating a first preferred technique for in-service migration from static optical networking to static plus agile optical networking in accordance with the present invention.
Figure 1B:
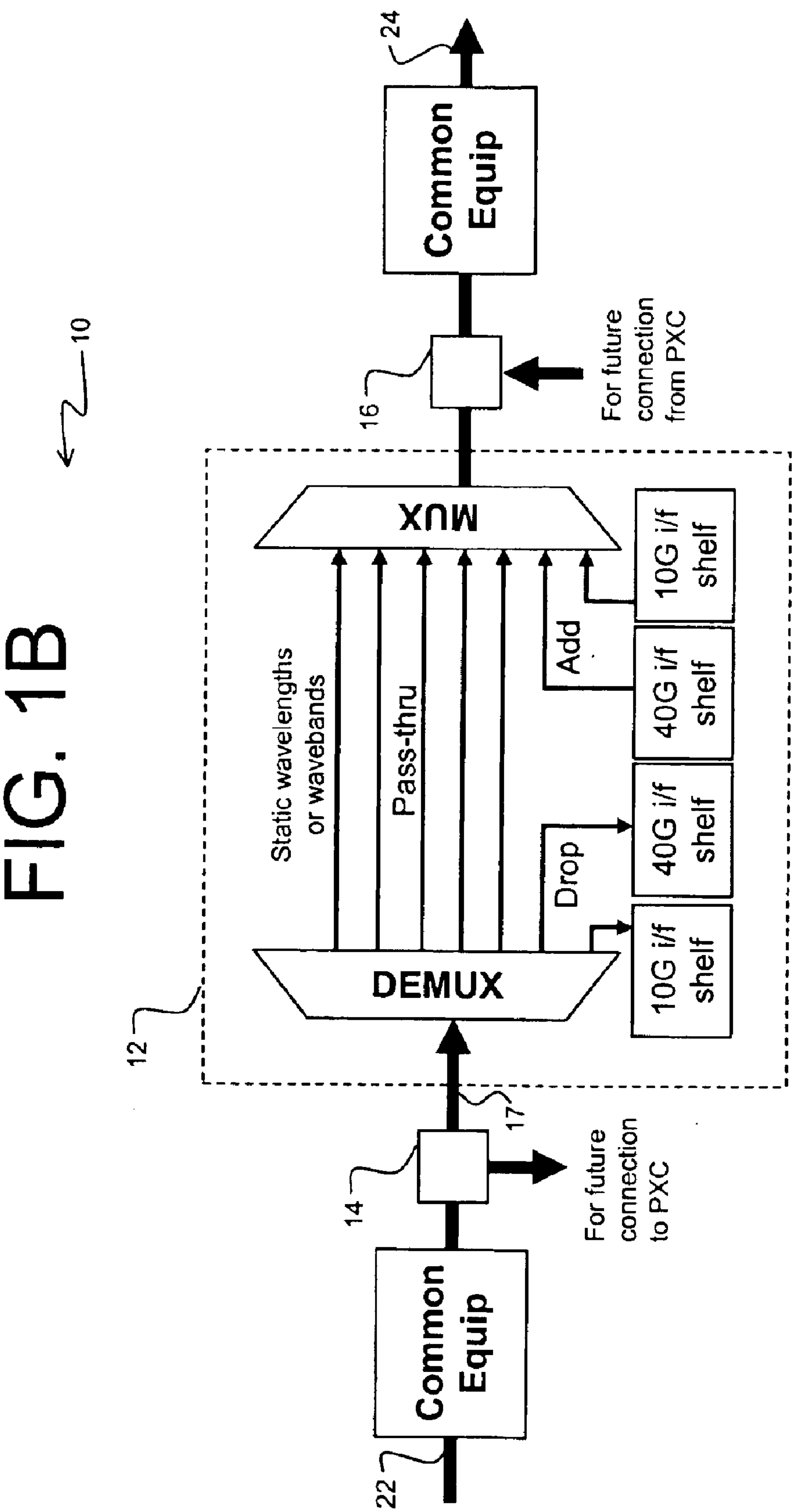
Figure 1C:
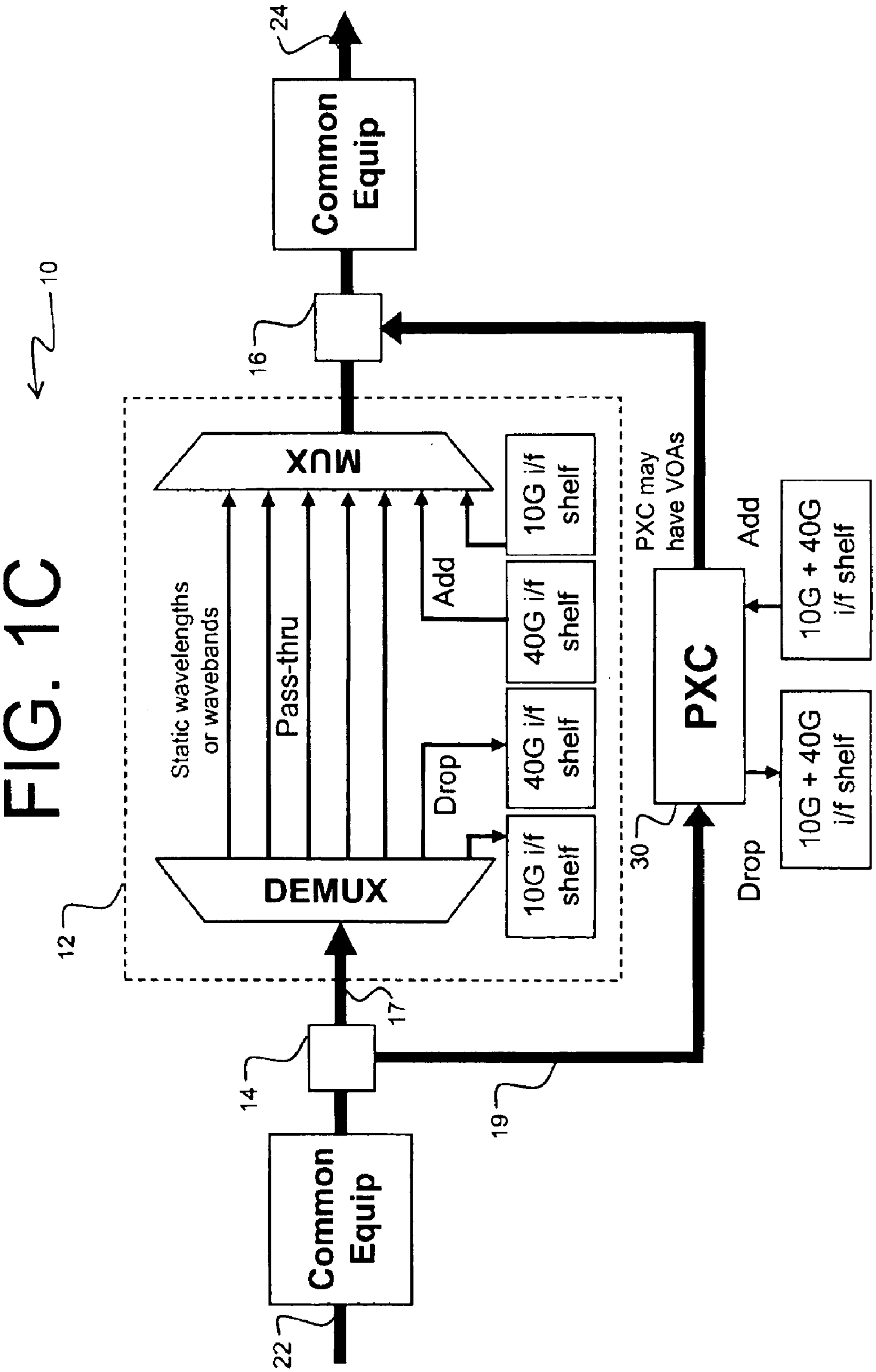

A seamless technique for in-service migration from static optical networking to static plus agile optical networking is depicted in FIGS. 1A–1C. Agile optical networking is generally achieved through the introduction of photonic switching at a network switching node 10, where the switching node 10 interconnects at least two optical transport line systems. The optical transport line systems may employ a pair of unidirectional optical fibers (also referred to as fiber pairs) or a single bidirectional optical fiber. Referring to FIG. 1A, the exemplary network switching node 10 is shown as a fixed optical add/drop multiplexer 12. However, it is envisioned that this technique may be applied to other initial network arrangements residing in a core optical network.

In a WDM optical transport network, numerous optical data signals are multiplexed together to form a single optical system signal. The optical system signal may be constituted in an optical line hierarchy as is known in the art. For example, the optical system signal may be constructed from a plurality of optical band signals, where each of the optical band signals is constructed from a plurality of optical waveband signals and each of the optical waveband signals are constructed from a plurality of optical wavelength signals. Although the fixed optical add/drop multiplexer 12 preferably operates to add, drop, manually route, or otherwise manipulate optical wavelength signals, it is readily understood that the multiplexer may support optical data signals at any one of the hierarchical layers that form an optical system signal. Optical band signals and optical waveband signals are herein referred to as optical multiplexed signals.

In-service migration is enabled by a properly terminated optical splitter 14 located at the node input and a properly terminated optical combiner 16 located at the node output as shown in FIG. 1B. The optical splitter 14 receives an optical multiplexed signal from a first optical transport line 22. The optical splitter 14 in turn splits the optical multiplexed signal into two (or more) optical multiplexed signals as is well known in the art.

The fixed optical add/drop multiplexer 12 receives one of the optical multiplexed signals 17 from the signal splitter 14. The optical multiplexed signal 17 embodies a plurality of data signals. In accordance with the present invention, the optical multiplexed signal includes (or will include) at least one agile data signal (also referred to as an agile connection). The remaining data signals (or connections) are configured statically within the fixed optical add/drop multiplexer 12. The fixed optical add/drop multiplexer 12 enables manual connection of static data signals.

A photonic cross-connect switch 30 may be subsequently introduced between the signal splitter 14 and the signal combiner 16 as shown in FIG. 1C. Specifically, the photonic switch 30 receives a second optical multiplexed signal 19 from the signal splitter 14. The photonic switch 30 can then switch or otherwise process the agile data signals. At introduction, the photonic switch 30 initially blocks (or disables) all of the data signals received. The photonic switch 30 then enables agile data signals as they materialize.

A signal combiner 16 receives optical multiplexed signals from both the optical multiplexer 12 and the photonic switch 30. The signal combiner 16 in turn combines the two optical multiplexed signals to form a single optical multiplexed signal. The optical multiplexed signal may then be launched into a second optical transport line 24. In this way, a seamless technique is provided for in-service migration from static optical networking to static plus agile optical networking. For simplicity, only one direction of transmission has been described. However, it is readily understood that the switching node is ordinarily configured to support bidirectional traffic, meaning another mirror image system for the other direction.

New agile service connections are introduced through the add/drop side of the photonic switch 30. At switching nodes with no agile add/drop service connections, the photonic switch 30 is not essential, but can still be deployed to enable more flexible network reconfiguration and restoration of agile service connections that pass through the switching node. Thus, agile pass through traffic growth is inherent, and agile add/drop traffic growth is 'pay-as-you-go' in terms of as required additional local agile service interfaces.

Implementation of this in-service migration requires adequate isolation between the static and agile network traffic. It is envisioned that isolation may be increased by variable optical attenuators (VOAs) that further suppress static connections at the output of the photonic switch 30. Additional isolation techniques are described below. In any case, the optical transport system must be able to tolerate any limitations on isolation of blocked static connections through the photonic switch which will combine with static connections at the signal combiner. Similarly, the optical transport system must be able to tolerate any noise in unused static connections which will combine with agile connections at the signal combiner. Lastly, optical losses introduced by the optical splitter and combiner are nominally 3 dB per branch, but may differ depending on loss tolerance of static and agile paths. These losses may be cancelled by common equipment amplifiers with negligible optical signal-to-noise ratio (OSNR) impairments.

Figure 2:
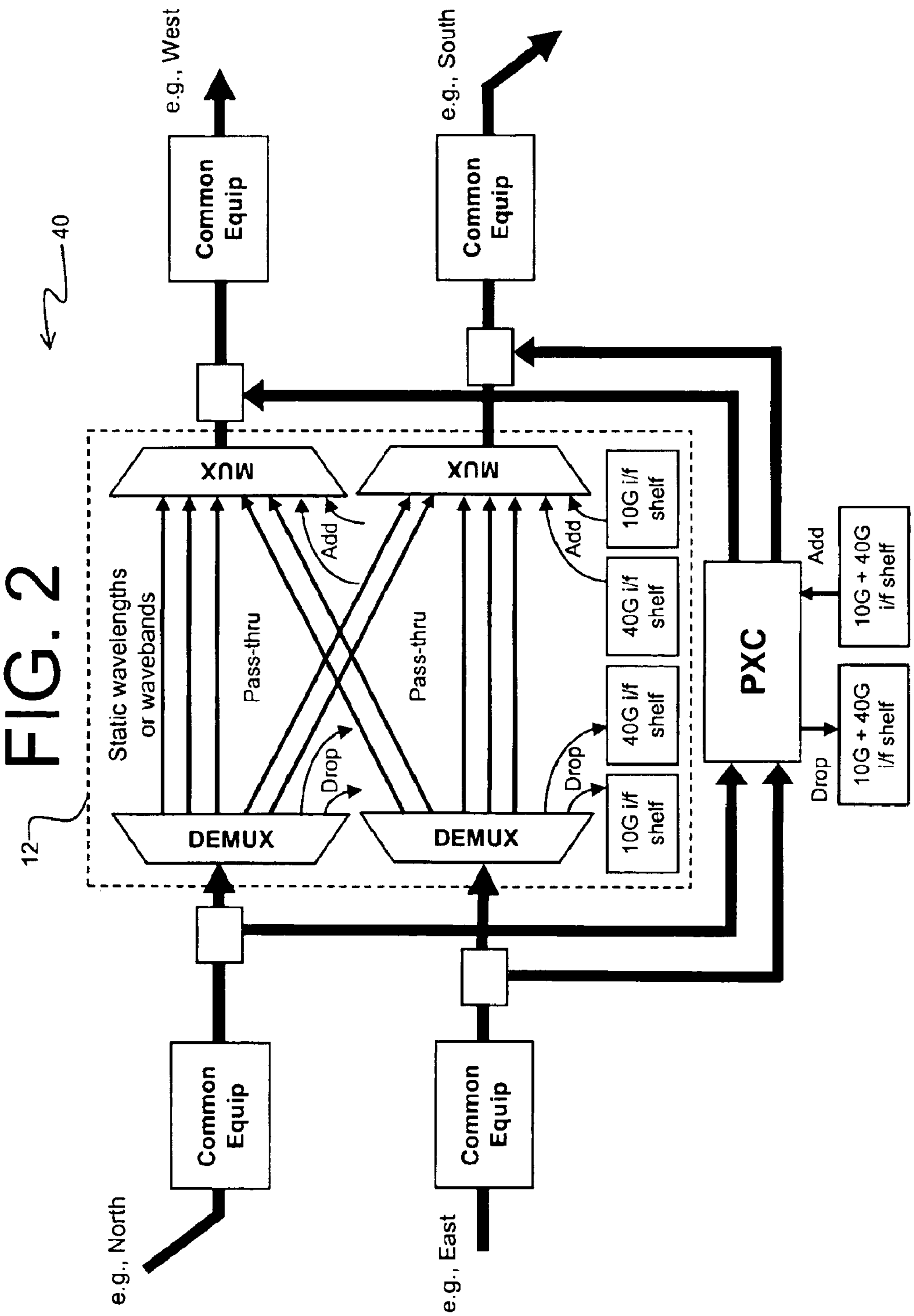
FIG. 2 is a block diagram illustrating how the in-service migration technique may be applied to a switching node that supports four fiber pairs which carry a mix of static and agile connections.

FIG. 2 illustrates in-service migration for a switching node 40 that supports four fiber pairs, where the additional fiber pairs may carry a mix of static and agile connections. In this case, the switching node, including the photonic switch, is initially configured to support up to four fiber pairs. When less than four fiber pairs are connected to the switching node, additional fiber pairs can be subsequently added in a non-disruptive manner. Depending on the scalability of the photonic switch, one skilled in the art will readily recognize that this arrangement is further extendable to switching nodes that support more or less than four fiber pairs.

Figure 3:
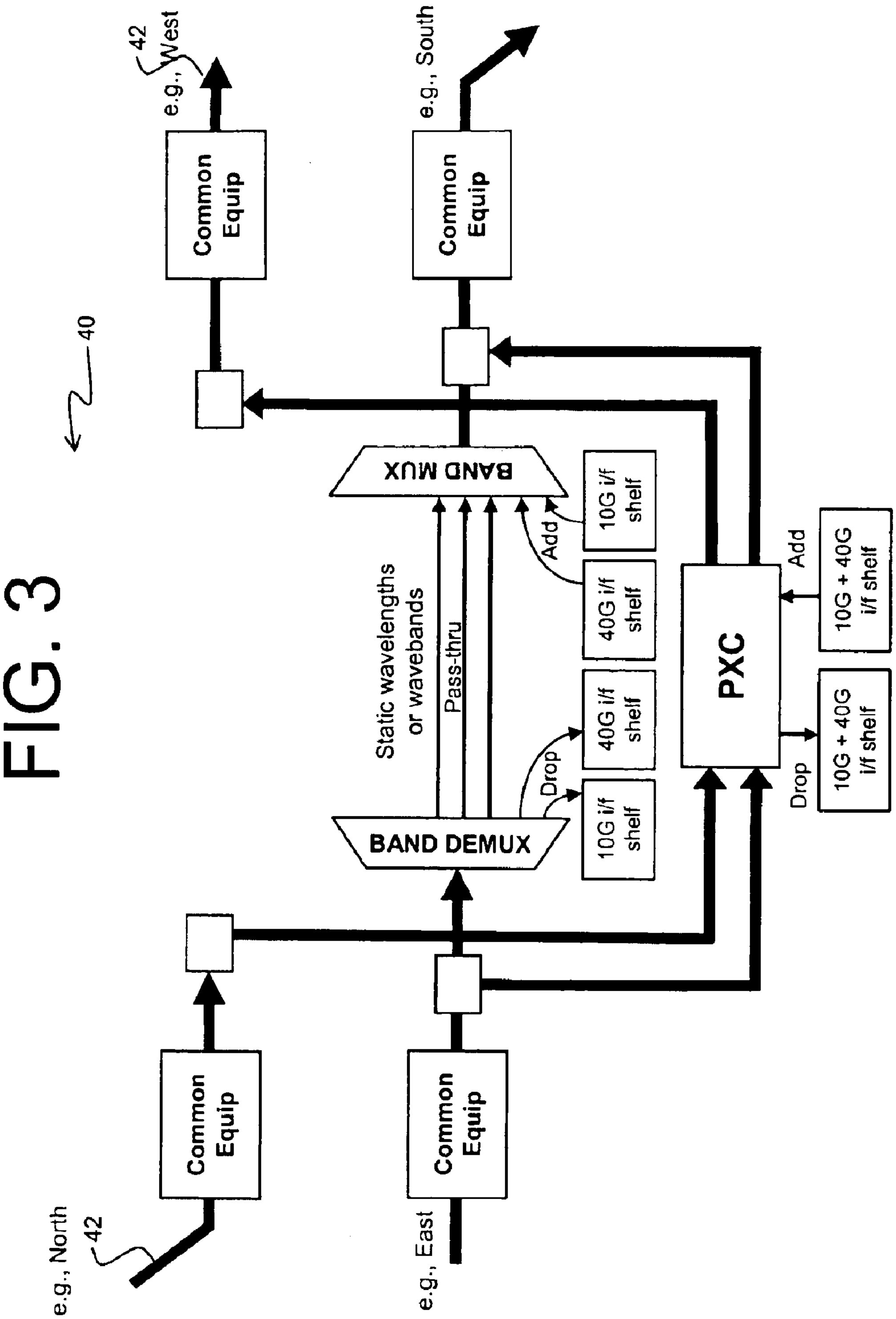
FIGS. 3 and 4 are block diagrams illustrating how the in-service migration technique may be applied to a switching node that supports the addition of at least one fiber pair that carries all static and/or all agile connections.
Figure 4:
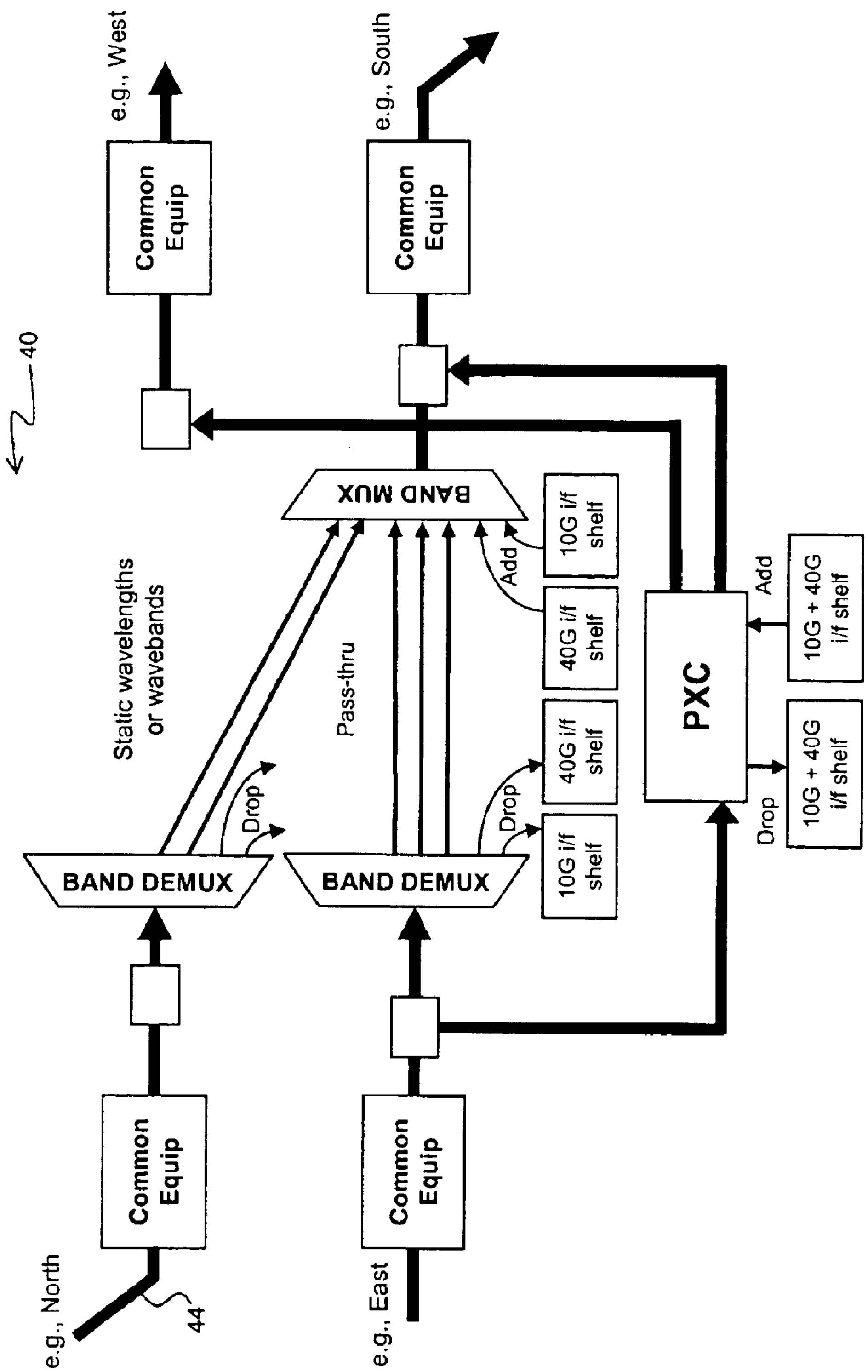

When the additional fiber pairs 42 carry all agile connections, there is no need for corresponding multiplexers and demultiplexers within the context of the fixed optical add/drop multiplexer as shown in FIG. 3. However, multiplexers and/or demultiplexers may be non-disruptively added later if static traffic materializes. Similarly, when the additional fiber pair 44 carries all static connections, there is no need for a connection to the photonic switch as shown in FIG. 4. Again, multiplexers, demultiplexers and/or switch connections may be non-disruptively added later if previously unexpected static and/or agile traffic materializes.

Figure 5:
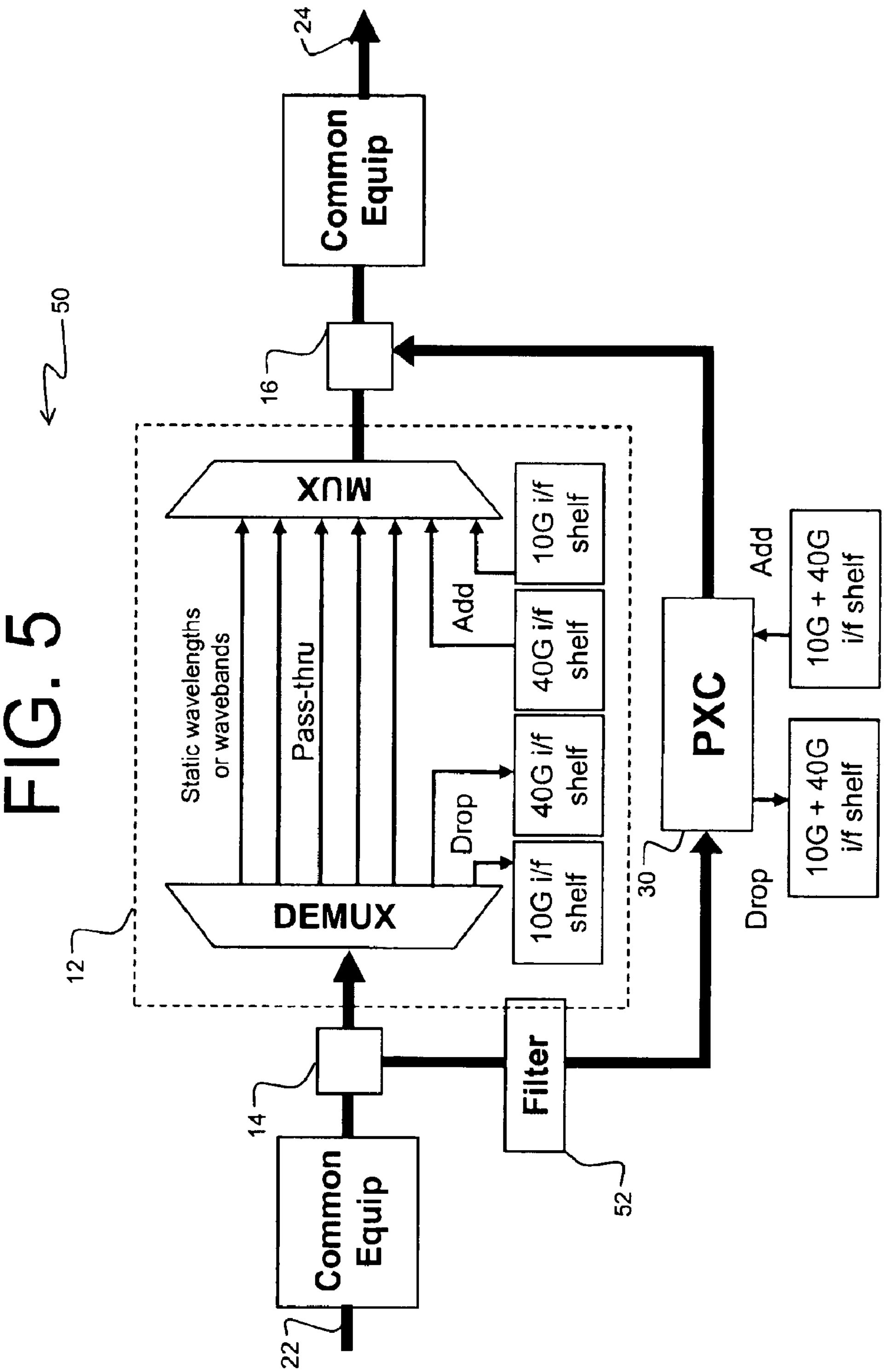
FIG. 5 is a block diagram that illustrates a technique for improving isolation in the switching node in accordance with the present invention.

FIG. 5 illustrates an additional technique for improving isolation in the switching node. This technique introduces a pre-switch filter 52 to improve isolation of blocked static connections through the photonic switch. The filter is located between the signal splitter 14 and the photonic switch 30. The filter 52 rejects static data signals and passes agile data signals to the photonic switch 30. The switching node otherwise operates as described above.

Figure 6:
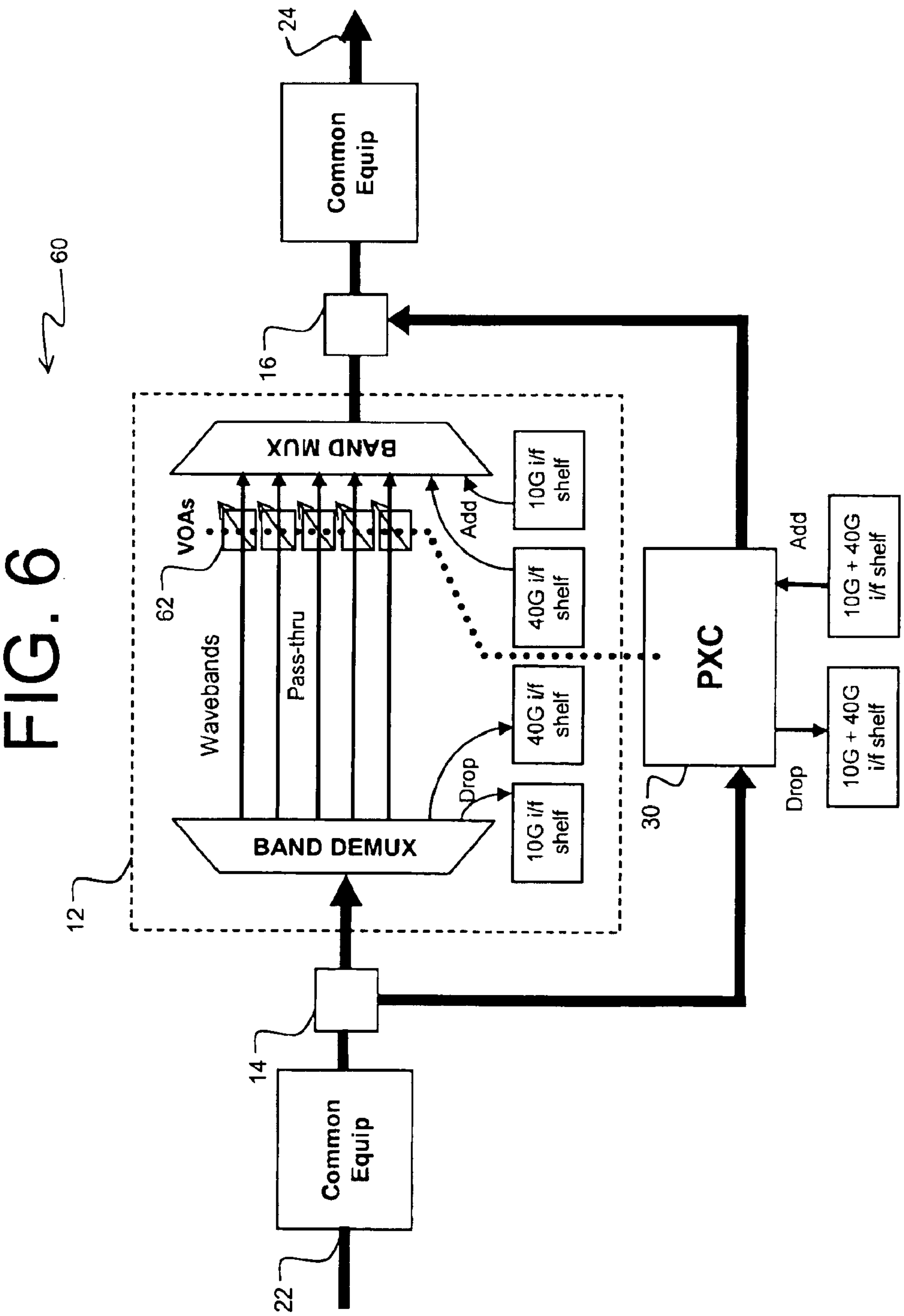
FIGS. 6 and 7 are block diagrams illustrating how unused static bandwidth can be recovered, by either VOAs or switches, for use by the agile connections of the switching node in accordance with the present invention.

In the case of an optical waveband architecture, it is further envisioned that unused static bandwidth can be recovered for use by the agile connections as shown in FIG. 6. In general, selected pass-through wavebands are 'rolled' to the photonic switch 30 for higher fill. Preferably, one waveband is rolled at a time with subsequent verification testing. After the 'roll', the pass-through patch cords for the corresponding waveband can be removed from the multiplexer 12. This prevents interference between static and agile pass-through connections as well as prevents any noise in unused static connections from combining with corresponding agile connections at the signal combiner 16.

More specifically, a plurality of variable optical attenuators (VOAs) 62 are inserted into the static connections of the fixed optical add/drop multiplexer 12. The photonic switch 30 initially blocks all static connections and enables all agile connections. To recover unused static bandwidth in a waveband, the preferred approach employs local control as described below. First, the corresponding VOA ramps down the selected waveband power to as low as possible and at a slow rate that is non-disruptive to any other connections. The photonic switch 30 then enables all static connections in this waveband to pass through the switch. A photonic switch equipped with VOAs would ramp-up all static connections in the waveband to the correct power level and at a slow rate that is non-disruptive to any other connections. Unused bandwidth in this waveband can then be used for agile connections. As will be apparent to one skilled in the art, this approach causes a brief disruption to the static connections being rolled, but does not affect the other connections. The slow power ramp down and power ramp up is optional, and depends on the requirements of the downstream optical network. It is not required if the downstream network can handle the transients resulting from a fast roll-over. For example, certain semiconductor-based "linear optical amplifiers" may be able to handle transients, e.g. dropping some channels, while causing no effect on remaining channels.

Figure 7:
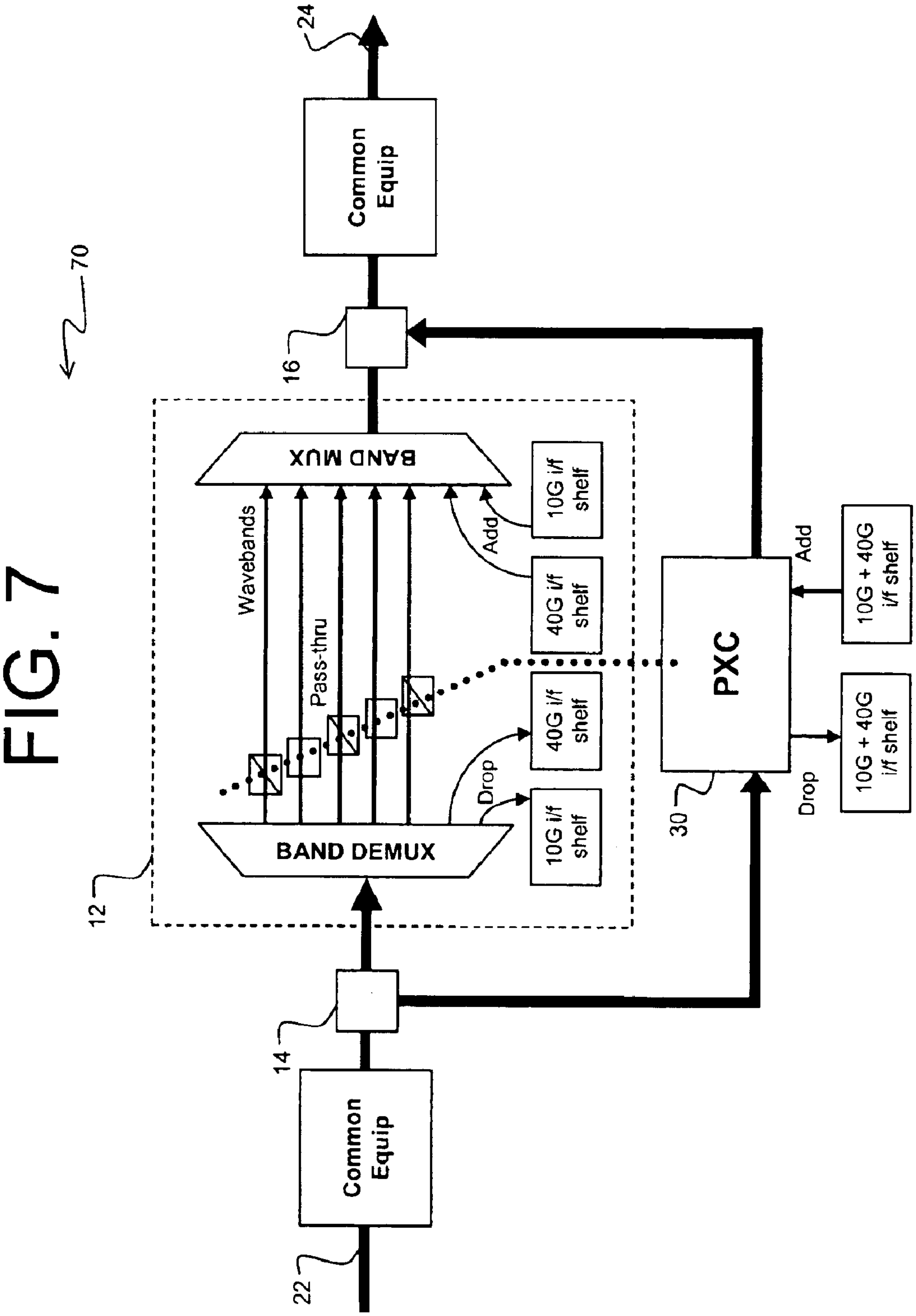

In an alternative embodiment, a plurality of open/closed switches 72 are inserted into the static connections of the fixed optical add/drop multiplexer 12 as shown in FIG. 7. In this embodiment, the corresponding switches open the waveband path, thereby enabling all static connections in the waveband to pass through the photonic switch 30. Unused bandwidth in this waveband can then be used for agile connections. Although simpler than the approach described above, this approach causes a brief disruption to all of the connections, not just those being rolled. This approach does not support the option of slowly ramping down the power in the static waveband that is to be rolled to the photonic switch 30. Again, the severity depends on the behavior of the downstream optical network. However, the downstream optical network may be able to handle the resulting transients without disrupting the other connections.

Figure 8:
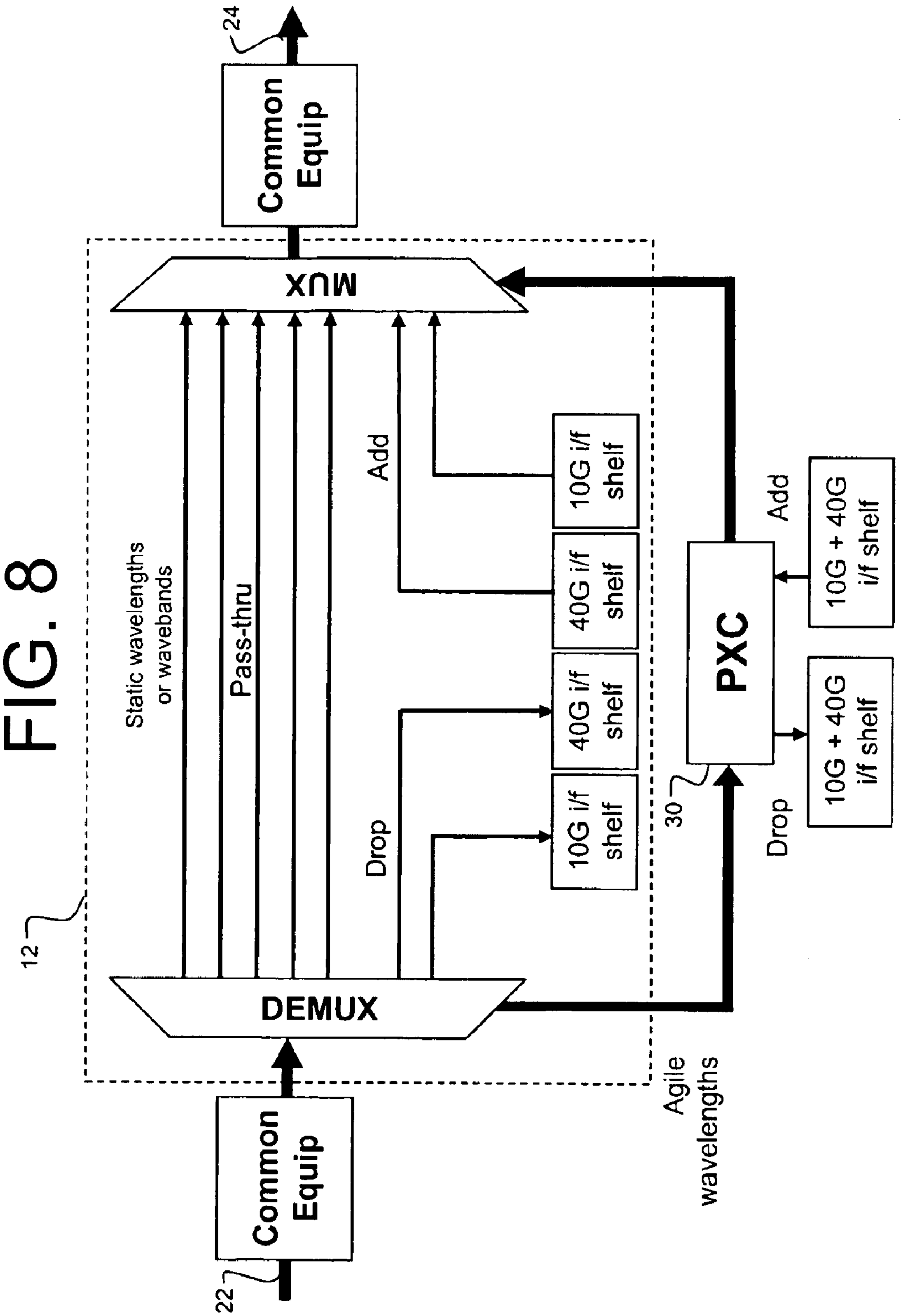
FIG. 8 is a block diagram illustrating a second preferred technique for in-service migration from static optical networking to static plus agile optical networking in accordance with the present invention.

In an alternative approach, static and agile traffic is selected within the demultiplexer as generally shown in FIG. 8.

Figure 9:
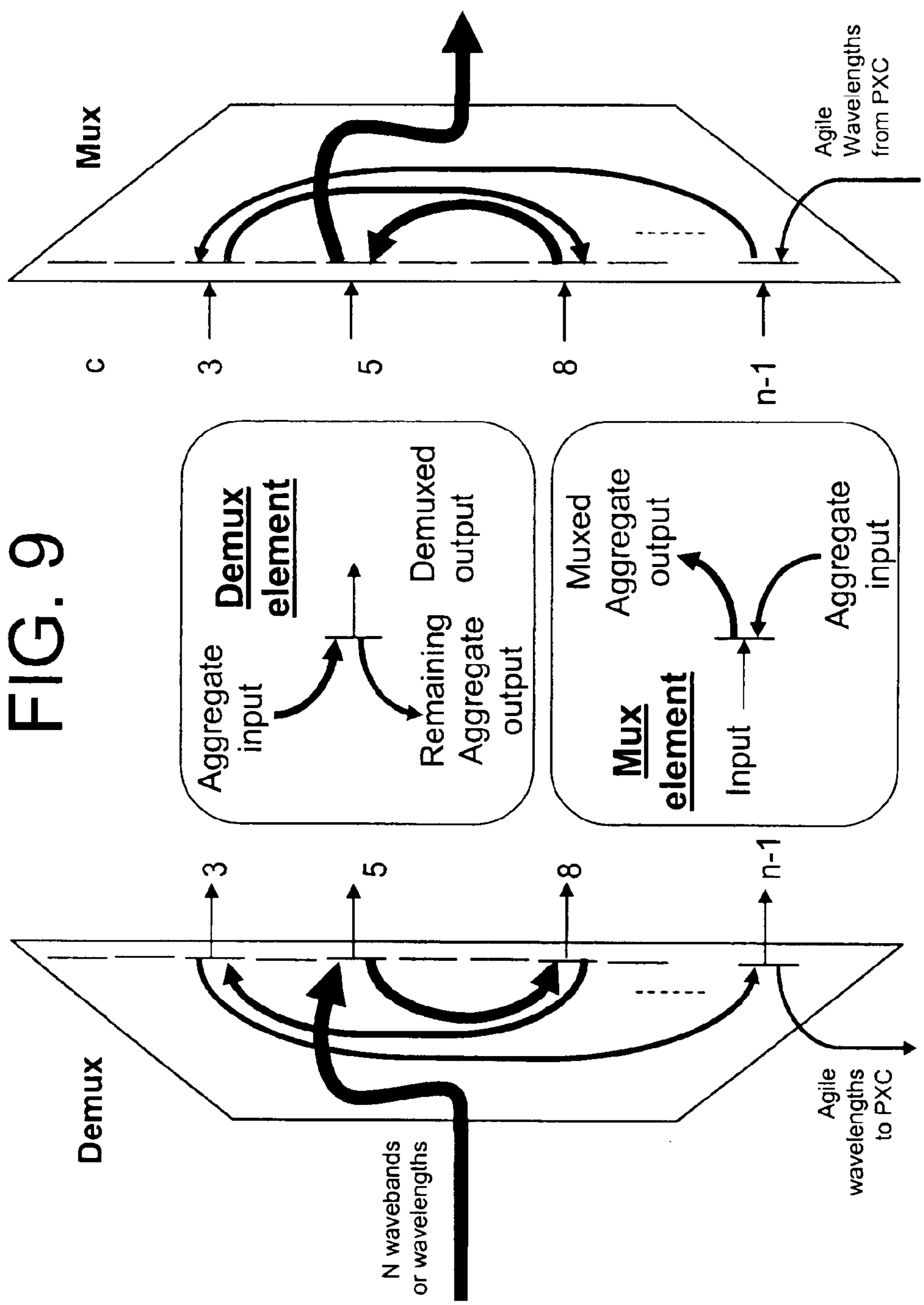
FIG. 9 is a diagram of how network traffic may be statically pre-selected within a demultiplexer and multiplexer of the switching node.

In a first embodiment, static traffic is pre-selected. Referring to FIG. 9, static traffic is passed through to the multiplexer; whereas agile traffic is routed from the demultiplexer to the photonic switch. Pre-selection assumes traffic will not change over time or requires considerable disruption to subsequently alter the nature of the connections.

Figure 10:
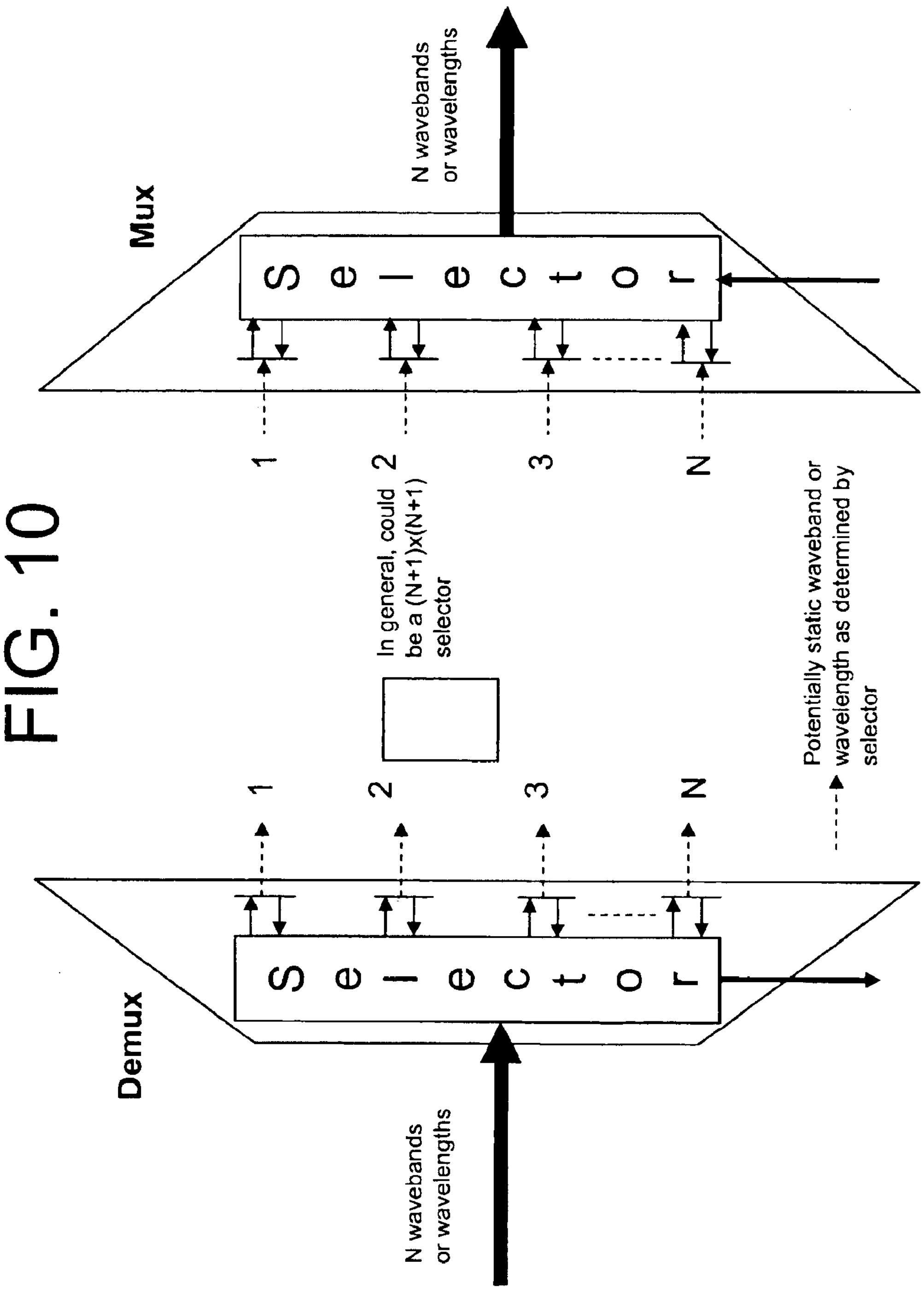
FIG. 10 is a diagram of how network traffic may be flexibly selected within a demultiplexer and multiplexer of the switching node.
Figure 11:
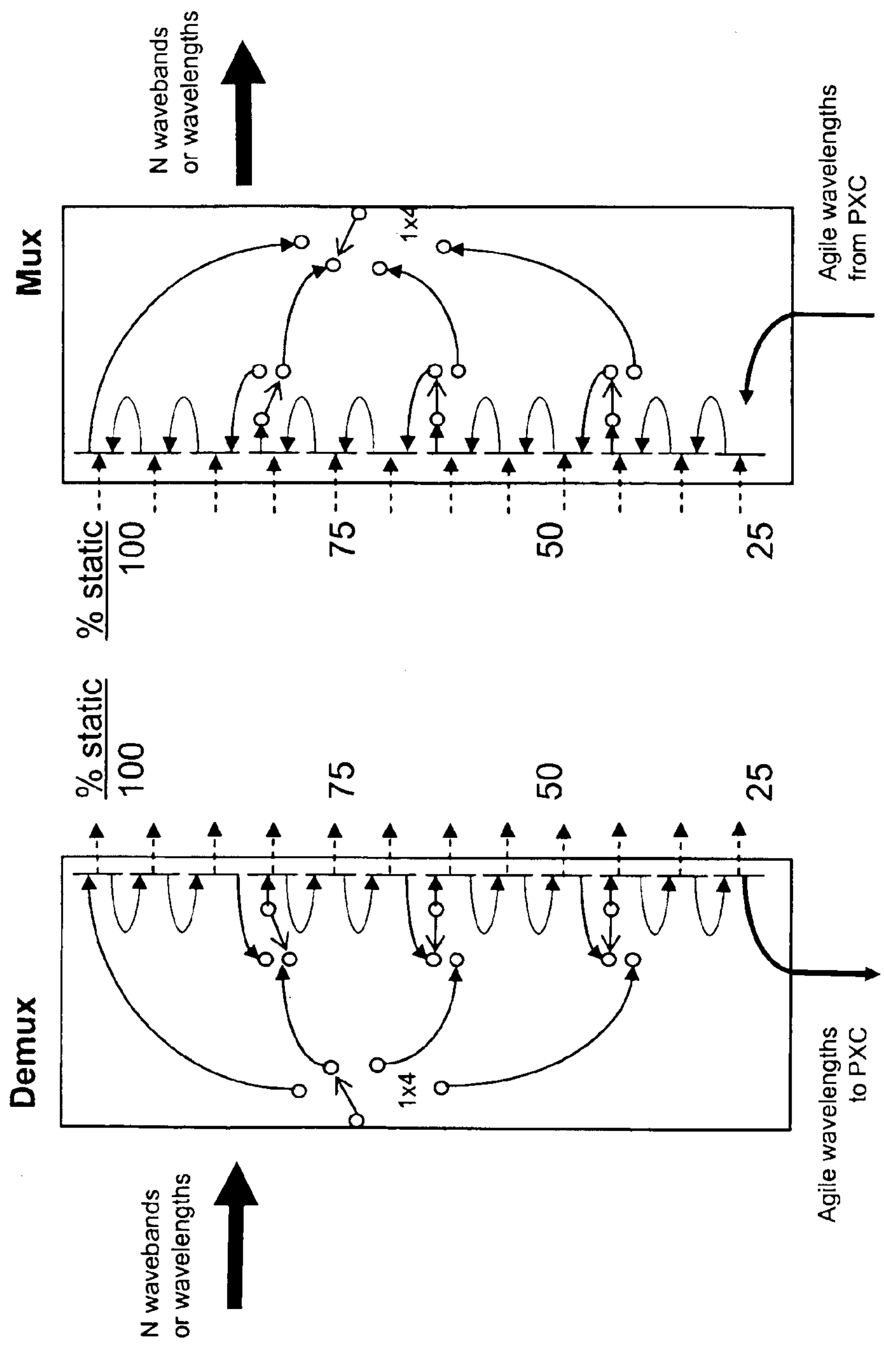
FIG. 11 is a diagram depicting an exemplary selector for a degree of flexibility selecting network traffic in a demultiplexer and multiplexer of the switching node.

In a second embodiment, the allocation of static traffic may be flexibly changed within the demultiplexer as shown in FIG. 10. For instance, a selector is used to flexibly allocate static traffic. Again, static traffic is passed through to the multiplexer; whereas agile traffic is routed from the demultiplexer to the photonic switch. An exemplary selector 90 is depicted in FIG. 11, for a degree of flexible selectivity.

Figure 12A:
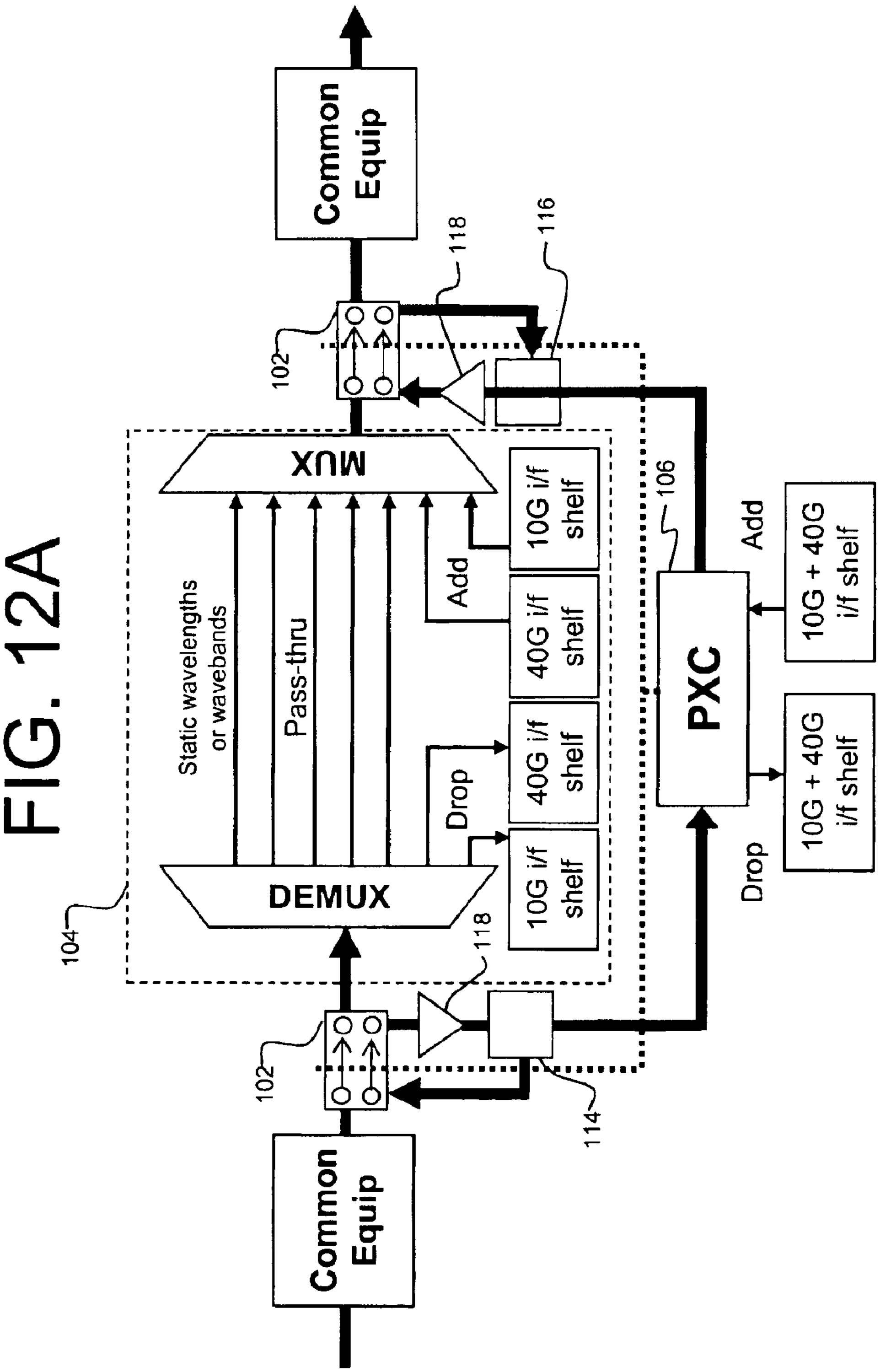
FIGS. 12A and 12B are block diagrams illustrating a third preferred technique for migrating from static optical networking to static plus agile optical networking in accordance with the present invention.
Figure 12B:
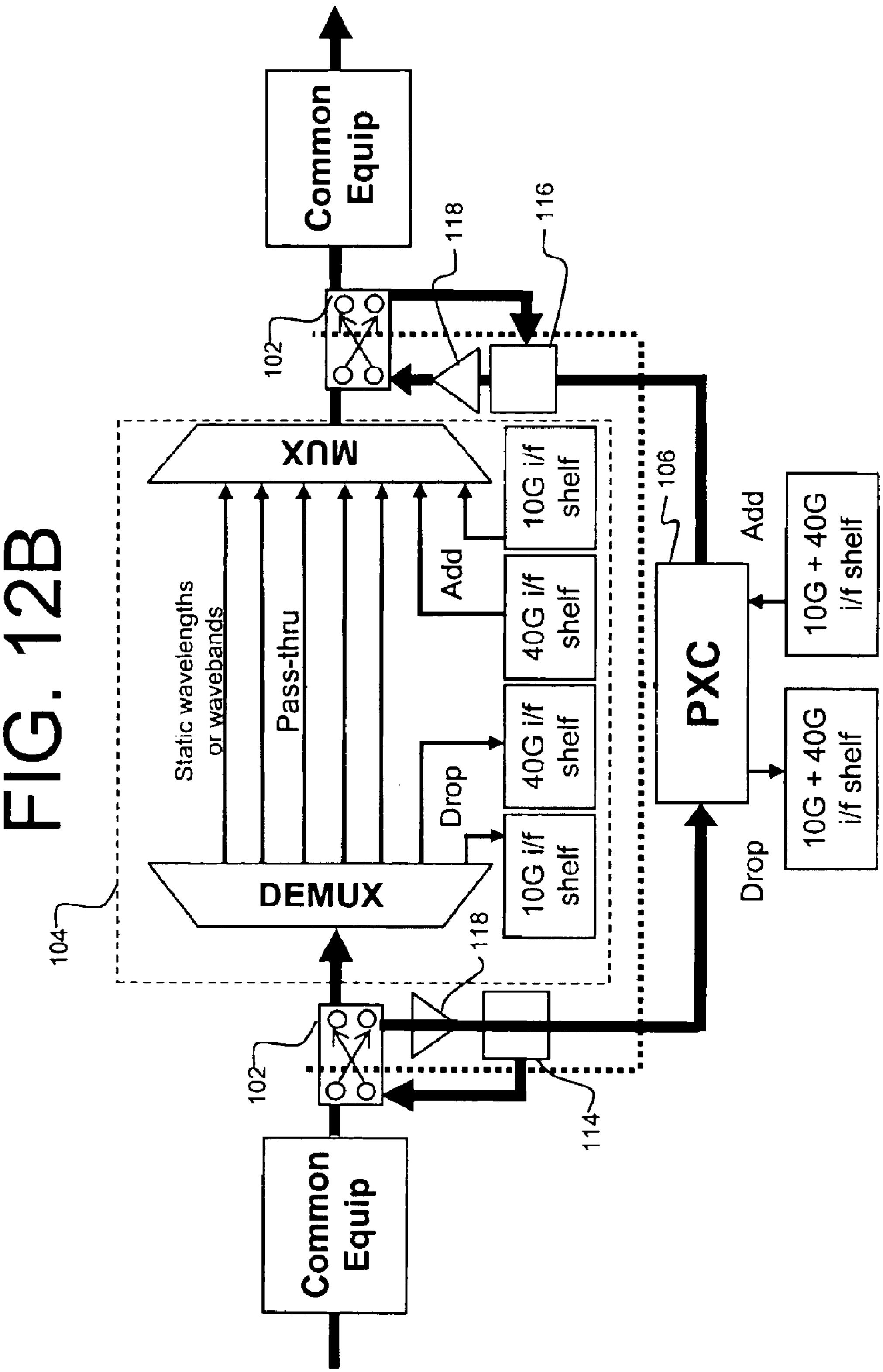

FIGS. 12A and 12B illustrates a service affecting technique for migrating from static optical networking to static plus agile optical networking. In this alternative embodiment, 2×2 switches 102 are located at the input and output of the fixed optical add/drop multiplexer 104. The switches 102 are initially configured to pass through the optical multiplexed signal as shown in FIG. 12A. The fixed optical add/drop multiplexer 104 enables manual connection of static data signals.

A photonic cross-connect switch 106 may be subsequently located between the two switches 102. At introduction, the photonic switch 106 initially blocks all of the data signals and operates the 2×2 switches 102 to a "cross" configuration which routes the optical multiplexed signal towards the photonic switch 106 as shown in FIG. 12B. If required, the photonic switch 106 would also then increase initially low optical amplifier 118 gains to the correct levels, or would enable the amplifier to start amplifying.

On the input side of the node, a signal splitter 114 is located between the 2×2 switch 102 and the photonic switch 106. The signal splitter 114 receives an optical multiplexed signal from the switch 102 and splits it into two optical multiplexed signals. One of the optical multiplexed signals is directed to the photonic switch 106; whereas the other optical multiplexed signal is routed back through the 2×2 switch 102. The photonic switch 106 can switch the agile data signals, thereby enabling agile optical networking. The 2×2 switch 102 also provides a return path for the static signal channels to the fixed optical add/drop multiplexer 104.

On the output side of the node, a signal combiner 116 is located between the 2×2 switch 102 and the photonic switch 106. The signal combiner 116 receives an optical multiplexed signal from the 2×2 switch 102 and the photonic switch 106. The signal combiner 116 in turn combines the two optical multiplexed signals and launches the combined signal into an outgoing optical transport line system.

In the initial static arrangement, the 2×2 switches have less optical loss than the splitter/combiner of the first preferred embodiment. However, existing network traffic is briefly disrupted when the 2×2 switches are operated and the photonic switch is introduced at the node. In addition, when traffic is routed through the photonic switch, the cumulative optical loss of the 2×2 switches 102 in conjunction with the signal splitter 114 and the signal combiner 116 is greater than for the first preferred embodiment. Again, these losses may be cancelled by common equipment amplifiers with negligible optical signal-to-noise ratio (OSNR) impairments.

Furthermore, optical amplifiers 118 may be optionally located between the 2×2 switches and the signal splitters/combiners to compensate for these additional losses. When the 2×2 switches 102 are initially configured in a pass through state, the optical amplifiers may be reduced in gain or disabled to suppress any oscillation in the feedback loop formed between the switch 102 and the signal splitter 114. Lastly, note that static pass-through connections being routed through the photonic switch enables recovery of stranded waveband bandwidth, and recovery of guard bands between adjacent wavebands. The static add and drop wavelengths or wavebands are still maintained.

Figure 13:
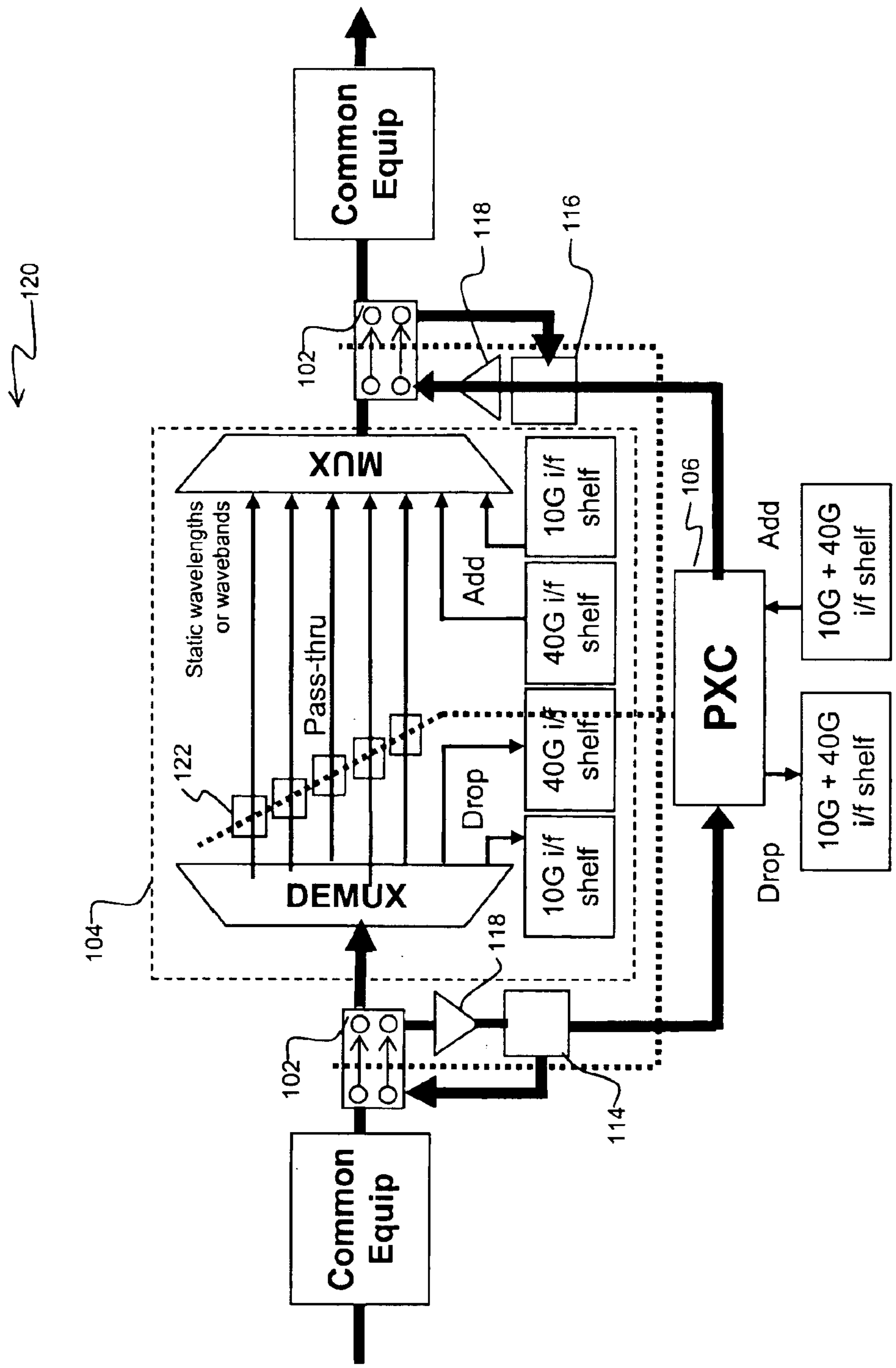
FIG. 13 is a block diagram illustrating how simple open/closed switches may be employed to better isolate static connections through the photonic switch of the switching node in accordance with the present invention.

A variation of this service affecting technique is shown in FIG. 13. A plurality of open/close switches 122 are inserted into the static connections of the fixed optical add/drop multiplexer. In an initial closed state, the switches 122 pass through the static data signals. At introduction, the photonic switch 106 initially blocks all of the data signals and operates the 2×2 switches 102 as described above. The photonic switch 106 may also open certain of the switches 122 residing in the fixed optical add/drop multiplexer. This enables corresponding static connections to be enabled through the photonic switch 106.

After the photonic switch has been introduced, the switches and pass-through patch cords for the operated switches 122 can be removed from the node. As a result, there is no possibility of interference between static and agile connections and any noise in unused static channels is prevented from combining with corresponding agile connections at the signal combiner 116. Lastly, note again that static pass-through connections being routed through the photonic switch enables recovery of stranded waveband bandwidth, and recovery of guard bands between adjacent wavebands. The static add and drop wavelengths or wavebands are still maintained.

While the invention has been described in its presently preferred form, it will be understood that the invention is capable of modification without departing from the spirit of the invention as set forth in the appended claims.

What is claimed is:

1. A method for seamless migration from static to agile optical networking at a network switching node in an optical transport network, the network switching node having an input and an output, comprising:

providing an optical signal splitter at the input of the network switching node, the signal splitter adapted to receive an optical multiplexed signal having a plurality of data signals and at least one data signal being agile;

providing an optical signal combiner at the output of the network switching node; splitting the optical multiplexed signal into a first and a second partitioned multiplexed signal;

routing the first partitioned multiplexed signal to an optical add/drop multiplexer, the multiplexer operable to selectively add and selectively drop at least one of the optical data signals embodied in the first partitioned multiplexed signal routing the second partitioned multiplexed signal to a photonic cross-connect switch, the photonic cross-connect switch operable to switch the agile data signals;

providing an optical signal combiner at the output of the network switching node, the optical signal combiner adapted to receive the first partitioned multiplexed signal from the optical add/drop multiplexer and the second partitioned multiplexed signal from the photonic cross-connect switch and operable to combine the first and second partitioned multiplexed signal.

2. The method of claim 1 further comprises passing only the agile data signals to the photonic switch, thereby improving isolation in the switching node.

3. The method of claim 1 further comprises blocking the plurality of data signals received at the photonic switch and subsequently enabling the agile data signals to traverse the photonic switch.

4. The method of claim 3 wherein the step of enabling the agile data signals further comprises suppressing data signals other than the agile data signals within the photonic switch, thereby improving isolation in the switching node.

5. The method of claim 1 further comprises providing a second signal splitter at a second input of the network switching node, and adapting the photonic switch to receive a second optical multiplexed signal from the second signal splitter.

6. The method of claim 1 further comprises providing a second signal combiner at a second output of the network switching node and adapting the signal combiner to receive a third optical multiplexed signal from the photonic switch.

7. An agile switching node in an optical transport network, comprising;

a first optical transport line operable to carry an optical multiplexed signal therein, where the optical multiplexed signal having a plurality of data signals and at least one of the data signals being agile;

an optical signal splitter connected to the first optical transport line and operable to split the optical multiplexed signal into a first partitioned multiplexed signal and a second partitioned multiplexed signal;

an optical add/drop multiplexer adapted to receive the first partitioned multiplexed signal from the optical signal splitter and operable to selectively add and selectively drop at least one of the optical data signals embodied in the first partitioned multiplexed signal;

a photonic switch adapted to receive the second partitioned multiplexed signal from the optical signal splitter and operable to switch the agile data signals; and an optical signal combiner adapted to receive the first partitioned multiplexed signal from the optical add/drop site and the second partitioned multiplexed signal from the photonic switch, and to combine the first partitioned multiplexed signal with the second partitioned multiplexed signal.

8. The agile switching node of claim 7 further comprises a second optical transport line operable to carry a second optical multiplexed signal therein, the second optical multiplexed signal having a plurality of data signals and at least one of the data signals being agile; and a second optical signal splitter connected to the second optical transport line and operable to split the second optical multiplexed signal into a third partitioned multiplexed signal and a fourth partitioned multiplexed signal.

9. The agile switching node of claim 8 wherein the photonic switch is adapted to receive the third partitioned multiplexed signal and operable to switch the agile data signals.

10. The agile switching node of claim 8 wherein the optical add/drop multiplexer is adapted to receive the fourth partitioned multiplexed signal.

11. The agile switching node of claim 7 further comprising a second optical signal combiner adapted to receive a third partitioned multiplexed signal from the photonic switch and launch the third partitioned multiplexed signal into a third optical transport line.

12. The agile switching node of claim 7 further comprising a filter interposed between the signal splitter and the photonic switch, the filter operable to pass only the agile data signals to the photonic switch, thereby improving isolation in the switching node.

13. The agile switching node of claim 7 wherein the photonic switch is further equipped with variable optical attenuators to suppress data signals, other than the agile data signals, in the second partitioned multiplexed signal, thereby improving isolation in the switching node.

14. The agile switching node of claim 7 wherein the optical add/drop multiplexer further comprises:

a demultiplexer adapted to receive the first partitioned multiplexed signal and separate the first partitioned multiplexed signal into a plurality of data signals;

a multiplexer adapted to receive the plurality of data signals and combine the plurality of data signals to form an outgoing multiplexed signal; and a plurality of variable optical attenuators interposed between the demultiplexer and the multiplexer and collectively operable to selectively block one or more of the plurality of data signals from traversing through the optical add/drop multiplexer.

15. The agile switching node of claim 7 wherein the optical add/drop multiplexer further comprises:

a demultiplexer adapted to receive the first partitioned multiplexed signal and separate the first partitioned multiplexed signal into a plurality of data signals;

a multiplexer adapted to receive the plurality of data signals and combine the plurality of data signals to form an outgoing multiplexed signal; and a plurality of switches interposed between the demultiplexer and the multiplexer and collectively operable to selectively block one or more of the plurality of data signals from traversing through the optical add/drop multiplexer.

16. An agile switching node in an optical transport network, comprising;

a first optical transport line operable to carry an optical multiplexed signal therein, where the optical multiplexed signal having a plurality of data signals and at least one of the data signals being agile;

a first optical switch having two input ports and two output ports, the first optical switch adapted to receive the optical multiplexed signal from the optical transport line and operable to route the optical multiplexed signal amongst the two output ports;

an optical signal splitter connected to one output port of the first optical switch and operable to split the optical multiplexed signal into a first partitioned multiplexed signal and a second partitioned multiplexed signal, where the first partitioned multiplexed signal is routed to an input port of the first optical switch;

an optical add/drop multiplexer adapted to receive the first partitioned multiplexed signal from the first optical switch and operable to selectively add and selectively drop at least one of the data signals embodied in the first partitioned multiplexed signal;

a photonic switch adapted to receive the second partitioned multiplexed signal from the optical signal splitter and operable to switch the agile data signals;

a second optical switch having two input ports and two output ports, the second optical switch adapted to receive the first partitioned multiplexed signal from the optical add/drop multiplexer and operable to route the first partitioned multiplexed signal amongst the two output ports; and an optical signal combiner adapted to receive the first partitioned multiplexed signal from the second optical switch and the second partitioned multiplexed signal from the photonic switch, and to combine the first partitioned multiplexed signal with the second partitioned multiplexed signal to form an outgoing optical multiplexed signal, where the outgoing multiplexed signal is routed to an input port of the second optical switch.

17. The agile switching node of claim 16 wherein the optical add/drop multiplexer further comprises:

a demultiplexer adapted to receive the first partitioned multiplexed signal and separate the first partitioned multiplexed signal into a plurality of data signals;

a multiplexer adapted to receive the plurality of data signals and combine the plurality of optical data signals to form an outgoing multiplexed signal; and a plurality of switches interposed between the demultiplexer and the multiplexer and collectively operable to selectively block one or more of the plurality of data signals from traversing through the optical add/drop multiplexer.

* * * * *